US008746776B2

(12) United States Patent
Schulzki et al.

(10) Patent No.: US 8,746,776 B2
(45) Date of Patent: Jun. 10, 2014

(54) ROOF CONSTRUCTION OF A MOTOR VEHICLE

(75) Inventors: Markus Schulzki, Ludwigsburg (DE); Kurt Pfertner, Friolzheim (DE); Gernot Bruder, Karlsruhe (DE)

(73) Assignees: Dr. Ing. h.c. F. Porsche Aktiengesellschaft, Stuttgart (DE); Magna Car Top Systems GmbH, Bietigheim-Bissingen (DE)

( * ) Notice: Subject to any disclaimer, the term of this patent is extended or adjusted under 35 U.S.C. 154(b) by 169 days.

(21) Appl. No.: 13/330,039

(22) Filed: Dec. 19, 2011

(65) Prior Publication Data
US 2012/0153665 A1  Jun. 21, 2012

(30) Foreign Application Priority Data
Dec. 17, 2010  (DE) .......................... 10 2010 055 038

(51) Int. Cl.
*B60J 7/00*  (2006.01)

(52) U.S. Cl.
USPC ....................................... 296/120.1; 280/756

(58) Field of Classification Search
USPC ............... 296/107.08, 107.16, 120.1, 107.01, 296/219; 280/756
See application file for complete search history.

(56) References Cited

U.S. PATENT DOCUMENTS

| 7,172,242 B2 | 2/2007 | Heselhaus |
| 2009/0152854 A1* | 6/2009 | Beierl et al. ................. 280/756 |
| 2012/0025506 A1* | 2/2012 | Beierl ............................ 280/756 |

FOREIGN PATENT DOCUMENTS

| DE | 3930343 A1 | 3/1991 |
| DE | 10248346 B3 | 1/2004 |
| DE | 102005037911 B3 | 1/2007 |
| DE | 102006052071 A1 | 5/2008 |
| DE | 102008027892 A1 | 12/2009 |
| EP | 0 845 378 B1 | 10/2001 |

* cited by examiner

*Primary Examiner* — Glenn Dayoan
*Assistant Examiner* — Pinel Romain
(74) *Attorney, Agent, or Firm* — RatnerPrestia

(57) ABSTRACT

A roof construction of a motor vehicle has a fixed roll bar, and a roof element which, in the closed position, is accommodated between the roll bar and a windshield and, in the open position, is accommodated behind the roll bar in a convertible-top compartment. The roof element can be shifted from the open position into the closed position and vice versa beyond the roll bar via an opening and closing mechanism. With the roof element in the closed position, the mechanism penetrates lateral offsets of the roll bar and, in the open position, opens up the lateral offsets. The lateral offsets of the roll bar are each assigned, on the front side of the roll bar, a covering which, in the closed position of the roof element, opens up the lateral offset for the passage of the mechanism and which, in the open position, covers the lateral offsets.

9 Claims, 3 Drawing Sheets

ROOF CONSTRUCTION OF A MOTOR VEHICLE

CROSS-REFERENCE TO RELATED APPLICATION

This application claims the priority, under 35 U.S.C. §119, of German application DE 10 2010 055 038.8, filed Dec. 17, 2010; the prior application is herewith incorporated by reference in its entirety.

BACKGROUND OF THE INVENTION

Field of the Invention

The invention relates to a roof construction of a motor vehicle.

European patent EP 0 845 378 B1 discloses a roof construction of a motor vehicle with a fixed roll bar. The roof construction known from the prior art furthermore has a roof element which, in a closed position, is positioned in front of the roll bar above front seats of the motor vehicle between the roll bar and an upper cowl of a windshield, and which, in the open position of the roof element, is accommodated behind the roll bar in a convertible-top compartment.

According to European patent EP 0 845 378 B1, the roof element of the roof construction can be shifted between the open position and the closed position and vice versa between the closed position and the open position by an opening and closing mechanism which, according to the prior art, is formed by links which are coupled by one end to the roof element and by another end to the motor vehicle body. The opening and closing mechanism shifts the roof element of the roof construction beyond the roll bar during the shifting from the open position into the closed position and vice versa from the closed position into the open position. In the closed position, the links of the opening and closing mechanism penetrate lateral impressions or offsets of the roll bar. By contrast, in the open position, the links of the opening and closing mechanism open up the impressions or offsets.

According to European patent EP 0 845 378 B1, the lateral offsets of the roll bar are open on a front side and on a rear side of the roll bar, the open offsets being perceived to be unesthetic in particular when the roof element of the roof construction is put away in the open position, and the opening and closing mechanism of the roof construction opens up the offsets. However, roof structures, with the aid of which this disadvantage can easily be eliminated, are not known to date.

SUMMARY OF THE INVENTION

It is accordingly an object of the invention to provide a roof construction of a motor vehicle which overcomes the above-mentioned disadvantages of the prior art devices of this general type, and is a novel construction.

With the foregoing and other objects in view there is provided, in accordance with the invention a roof construction of a motor vehicle having an upper cowl of a windshield and a convertible-top compartment. The roof construction contains a fixed roll bar having lateral, inwardly directed offsets, an opening and closing mechanism, a covering, and a roof element which, in a closed position, is accommodated in front of the fixed roll bar, namely between the fixed roll bar and the upper cowl of the windshield and, in an open position, the roof element is accommodated behind the fixed roll bar in the convertible-top compartment. The roof element can be shifted from the open position into the closed position and vice versa from the closed position into the open position beyond the fixed roll bar via the opening and closing mechanism, and, in the closed position of the roof element, the opening and closing mechanism penetrates the lateral, inwardly directed offsets of the fixed roll bar. In the open position of the roof element, the roof element opens up the lateral, inwardly directed offsets of the roll bar. The lateral, inwardly directed offsets of the fixed roll bar are each assigned, at least on a front side of the fixed roll bar, the covering which, in the closed position of the roof element, opens up a respective one of the lateral, inwardly directed offsets of the fixed roll bar for a passage of the opening and closing mechanism and which, in the open position of the roof element, covers the respective lateral, inwardly directed offset of the fixed roll bar.

According to the invention, the lateral offsets of the roll bar are each assigned, at least on the front side of the roll bar, a covering which, in the closed position of the roof element, opens up the respective lateral offset of the roll bar for the passage of the opening and closing mechanism and which, in the open position of the roof element, covers the respective lateral offsets of the roll bar.

The present invention first of all proposes a roof construction, in which lateral offsets of the roll bar, which offsets, in the closed position of the roof element of the roof construction, are penetrated by the opening and closing mechanism of the roof element, are covered, in the open position of the roof element, at least on the front side of the roll bar, by coverings. By this measure, the disadvantage affecting the prior art can be avoided.

In the closed position of the roof element, the opening and closing mechanism of the roof element preferably presses the respective covering of the respective lateral offset of the roll bar counter to a spring force acting on the respective covering into an opened-up position for the passage of the opening and closing mechanism whereas, in the open position of the roof element, the opening and closing mechanism of the roof element opens up the respective covering of the respective lateral offset of the roll bar and the covering is pressed by the spring force acting thereon into a covering position. The above configuration of the coverings which, in the open position of the roof element, are pressed under spring loading into the covering position and which, in the closed position of the roof element, are pressed by the opening and closing mechanism counter to the spring force into the open position, permits a particularly simple and reliable configuration of the coverings.

According to a first advantageous development of the invention, the respective covering of the respective lateral offset is configured as a tensioning element which is fastened to a spring clip. The design of the respective covering for the offsets of the roll bar as a tensioning element which is fastened to a spring clip is particularly simple structurally.

According to a second advantageous development of the invention, the respective covering of the respective lateral offset is configured as a covering flap. The design of the respective covering for the offsets of the roll bar as a covering flap ensures a continuously identical optical impression of a covering of the roll bar in the open position of the roof element.

Other features which are considered as characteristic for the invention are set forth in the appended claims.

Although the invention is illustrated and described herein as embodied in a roof construction of a motor vehicle, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

The present invention relates to a roof construction 10 of a motor vehicle and is described in detail below with reference to FIGS. 1 to 3.

Figure 1:
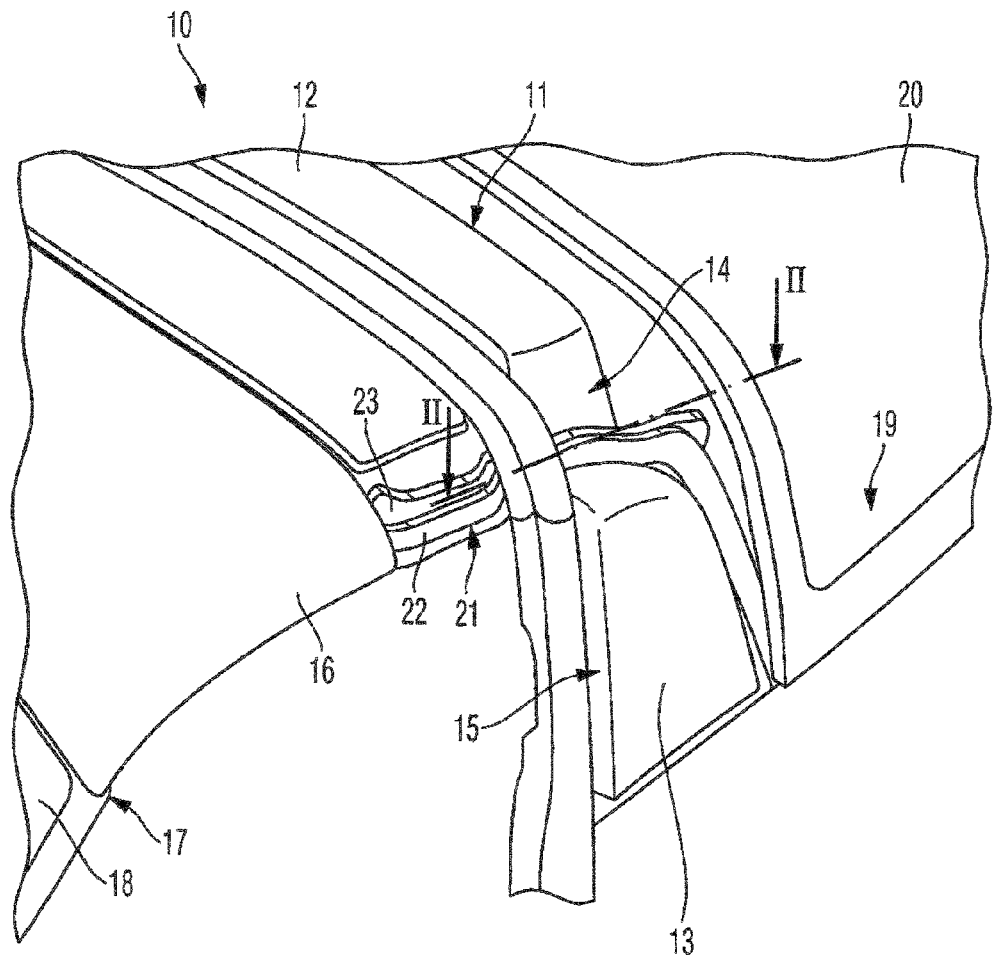
FIG. 1 is a diagrammatic, perspective view of a roof construction according to the invention of a motor vehicle according to a first exemplary embodiment of the invention.

FIG. 1 shows a perspective detail from the roof construction 10 according to the invention of the motor vehicle, wherein the roof construction 10 has a fixed roll bar 11. According to FIG. 1, the roll bar 11 has a transverse strut 12 extending substantially in a horizontal direction, and side struts 13 extending substantially in a vertical direction, wherein inwardly directed offsets 14 are formed between the side struts 13 and the transverse strut 12 of the roll bar 11.

FIG. 1 shows an offset 14 of this type in the transition region between the shown side strut 13 and the transverse strut 12 of the roll bar 11. The roll bar 11 is covered to the outside by a covering 15.

The roof construction 10 of FIG. 1 furthermore has a roof element 16 which, in a closed position shown in FIG. 1, is positioned between the roll bar 11 and an upper cowl 17 of a windshield 18 above seats of the motor vehicle. The roof element 16 can be shifted from the closed position shown in FIG. 1 into an open position, wherein, in the open position of the roof element 16, the latter is positioned or put away in a convertible-top compartment 19 of the motor vehicle behind the roll bar 11, and wherein the convertible-top compartment 19 is covered by a convertible-top compartment cover 20 both in the open position of the roof element 16 and in the closed position of same.

In order to shift the roof element 16 from the closed position into the open position and vice versa from the open position into the closed position use is made of an opening and closing mechanism 21 which is formed by links 22 and 23 in FIG. 1.

The links 22 and 23 are coupled by a first end to the roof element 16 and by a second end to the motor vehicle body in the region of the convertible-top compartment 19. The roof element 16 is shifted from the open position into the closed position and vice versa from the closed position into the open position beyond the roll bar 11, wherein, according to FIG. 1, the opening and closing mechanism 21 of the roof element 16, in the closed position of same, penetrates the lateral offsets 14 of the roll bar 11 from the front to the rear or from the rear to the front. It can thus be gathered from FIG. 1 that, in the closed position of the roof element 16, the links 22 and 23 of the opening and closing mechanism 21 extend through the offsets 14. By contrast, in the open position of the roof element 16, the opening and closing mechanism is moved out of the offsets 14 of the roll bar 11, and therefore the links 22 and 23 of the opening and closing mechanism 21 then open up the offsets 14.

As already explained, the roll bar 11 is covered on the outside by the covering 15. When the roof element 16 is shifted from the open position into the closed position and vice versa from the closed position into the open position, the outer covering 15 of the roll bar 11 is partially shifted relative to the fixed roll bar 11 in order to enable the movement of the opening and closing mechanism 21 of the roof element 16.

Figure 2:
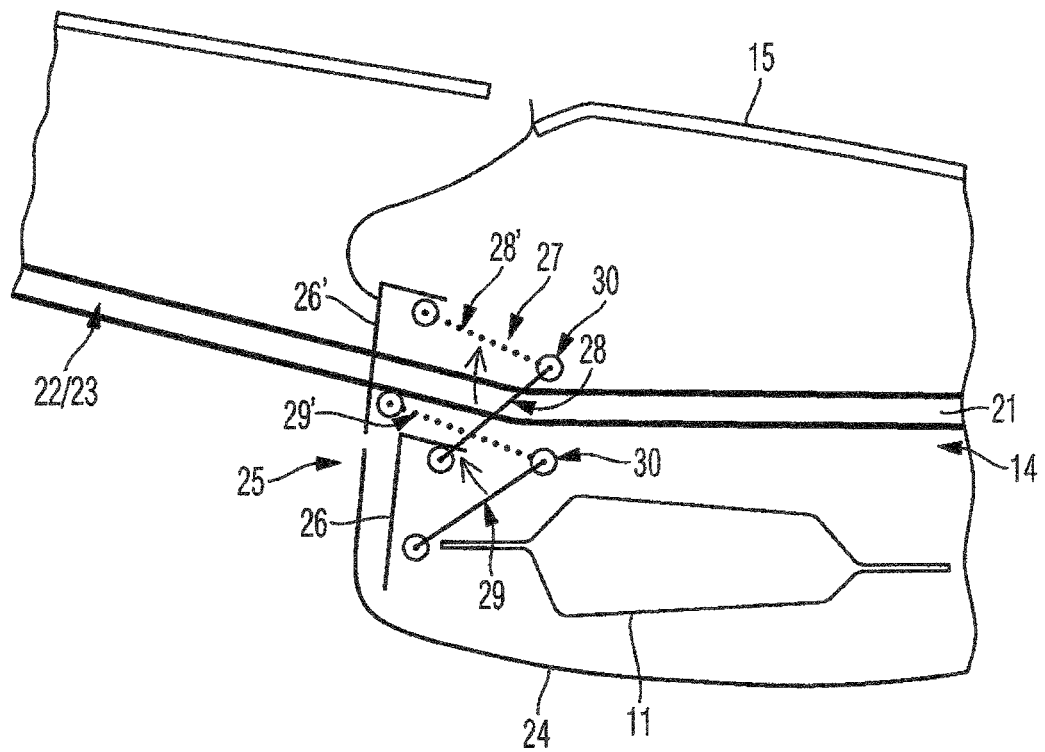
FIG. 2 is a diagrammatic, cross-sectional view through the arrangement of FIG. 1 taken along line II-II shown in FIG. 1.

As FIG. 2 shows, the roll bar 11 is furthermore covered on the inside in the interior region of the motor vehicle by a covering 24. The covering 24 is interrupted in the region of the lateral offsets 14 of the roll bar 11 in order, in the closed position of the roof element 16, to permit the passage of the opening and closing mechanism 21 of the roof element 16 through the lateral offsets 14 of the roll bar 11 from the front to the rear or from the rear to the front.

According to the invention, the lateral offsets 14 of the roll bar 11 are each assigned, at least on a front side 25 of the roll bar 11 or of the covering 24 of the roll bar 11, a covering 26 which, in the closed position of the roof element 16, opens up the respective lateral offset 24 of the roll bar 11 and the corresponding cutout in the covering 24 for the passage of the opening and closing mechanism 21, and which, in the open position of the roof element 16, covers the respective lateral offset 14 and the corresponding cutout in the covering 24 of the roll bar 11 in the region of the offset 14.

FIG. 2 shows the covering 26 of this type in different positions, namely, on the one hand, in an opened-up position, which is identified by reference number 26 and in which the covering 26 takes up in the closed position of the roof element 16, and in a covering position, which is identified by the reference number 26' in which the covering 26' takes up in the open position of the roof element 16.

In the closed position of the roof element 16, the opening and closing mechanism 21 of the roof element 16 presses the respective covering 26 of the respective lateral offset 14 of the roll bar 11 into the opened-up position 26, in which the passage of the opening and closing mechanism 21 through the offset 14 of the roll bar and through the covering 24 thereof in the interior region is then possible from the front to the rear or from the rear to the front.

In the closed position of the roof element 16 and therefore an opened-up position of the respective covering 26, the opening and closing mechanism 21 presses the respective covering 26 counter to a spring force acting thereon into the opened-up position 26.

By contrast, in the open position of the roof element 16, the opening and closing mechanism 21 of the roof element 16 opens up the respective covering 26', wherein the covering, which is identified by the reference number 26' in the open position of the roof element 16, is then pressed by the spring force into the covering position 26' in which the covering then complements the covering 24 of the roll bar 11 in the interior region of the motor vehicle.

In FIG. 2, the covering 26, 26' is configured as a dimensionally stable covering flap which can be shifted between the opened-up position 26 and the covering position 26' via a shifting mechanism 27. In the exemplary embodiment, the shifting mechanism 27 is formed by two links 28 and 29 which are each connected in an articulated manner by a first end to the roll bar 11 or to the covering of the roll bar and by a second, opposite end to the covering flap 26, 26'. The links 28, 29 of the shifting mechanism 27 are identified by the reference numbers 28 and 29 in the opened-up position of the covering 26 and by the reference numbers 28' and 29' in the covering position of the covering.

As already explained, in the closed position of the roof element 16, the respective covering is pressed by the opening and closing mechanism 21 of the roof element 16 counter to a spring force into the opened-up position 26 of the respective offset 14. By contrast, in the open position of the roof element 16, the opening and closing mechanism 21 of the roof element 16 opens up the respective covering 26, the latter then being pressed by the spring force into the covering position 26'. The spring force is preferably provided in FIG. 2 by spring elements 30 which act on the links 28 and 29 of the shifting mechanism 27.

Figure 3:
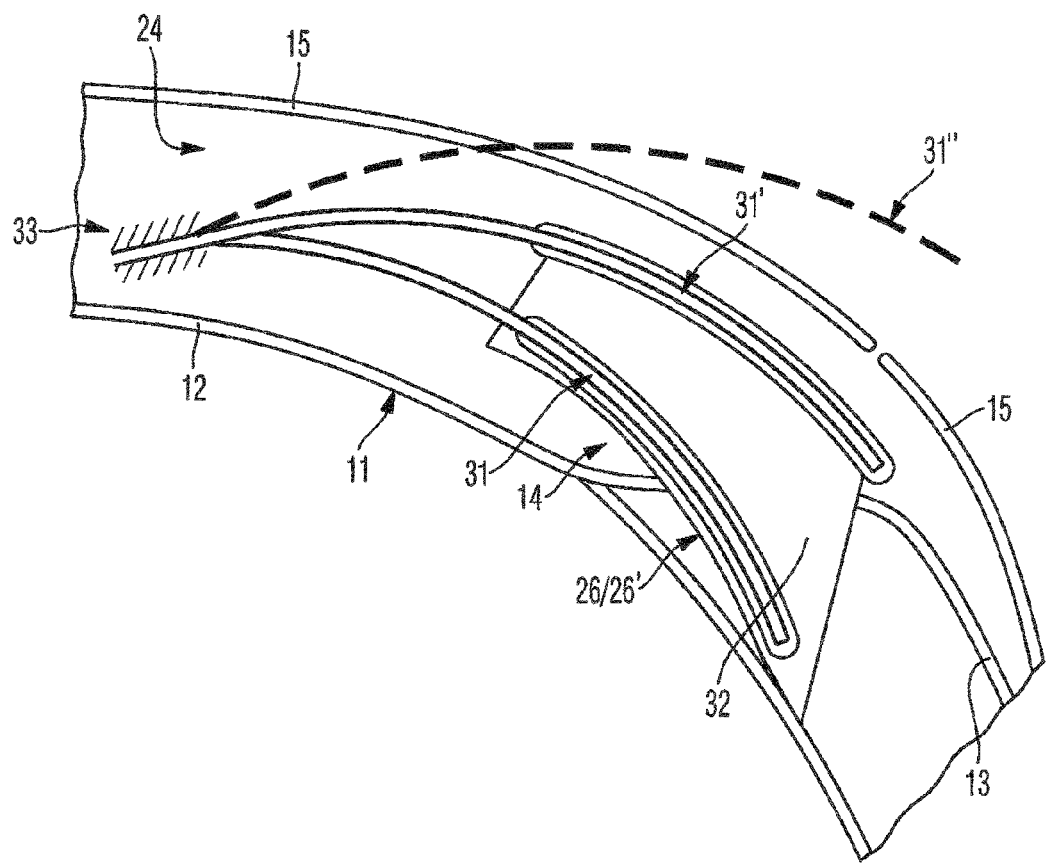
FIG. 3 is a diagrammatic, perspective view of the roof construction according to the invention of a motor vehicle according to a second exemplary embodiment of the invention.

FIG. 3 shows a second embodiment of the roof construction according to the invention, FIG. 3 showing a schematized view of the front interior lining 24 of the roll bar 11.

FIG. 3, in turn, shows a covering 26 for the offset 14 of the roll bar 11 and the corresponding recess of the covering 24, the covering 26 being formed in FIG. 3 by a spring clip 31 and a tensioning element 32 fastened to the spring clip 31.

FIG. 3 shows the spring clip 31 in a total of three different positions. In a first position of the spring clip, which position corresponds to the opened-up position 26 of the covering element, the spring clip is identified by the reference number 31. In the covering position of the covering, the spring clip is identified by the reference number 31', wherein, in the covering position, the spring clip 31' tensions the tensioning element 32 in order to cover the offset 14 and a corresponding recess in the interior covering 24. The third position 31" visualizes the relaxed form of the spring clip which the latter takes up in the unfitted state.

According to FIG. 3, the spring clip 31 is fixed at one end 33, and the spring clip 31 is preferably fastened at the end 33 to the roll bar 11 or to a covering thereof. The tensioning element 32, which can be provided, for example, by a fabric part or textile part or another flexurally slack material, is fastened at the opposite, free end of the roll bar 31.

The present invention accordingly proposes a roof construction for a motor vehicle with a roll bar 11 and a roof element 16 which can be shifted between a closed position and an open position and which has coverings 26 which are designed in the form of interior panels and which, in the open position of the roof element 16, in which the shifting mechanism 21 of the roof element 16 is moved out of the lateral offsets 14 of the roll bar 11, cover the lateral offsets 14 of the roll bar 11 at least on the front side of same. The offsets 14 can therefore be closed, thus enabling the quality of the interior appearance to be enhanced. In the open position of the roof element 16, the coverings 26 serving as interior panels are pressed by spring force into the corresponding covering position in order to cover the lateral offsets 14 of the roll bar 11. By contrast, in the closed position of the roof element 16, the opening and closing mechanism 21 of the roof element 16 presses the coverings 26 counter to the spring force into the opened-up position such that the opening and closing mechanism 21 of the roof element 16 can penetrate the offsets 14.

The invention claimed is:

1. A roof construction of a motor vehicle having an upper cowl of a windshield and a convertible-top compartment, the roof construction comprising:
   a fixed roll bar having lateral, inwardly directed offsets;
   an opening and closing mechanism;
   a covering; and
   a roof element which, in a closed position, is accommodated in front of said fixed roll bar, namely between said fixed roll bar and the upper cowl of the windshield and, in an open position, said roof element is accommodated behind said fixed roll bar in the convertible-top compartment and said roof element can be shifted from the open position into the closed position and vice versa from the closed position into the open position beyond said fixed roll bar via said opening and closing mechanism, and, in the closed position of said roof element, said opening and closing mechanism penetrating said lateral, inwardly directed offsets of said fixed roll bar and, in the open position of said roof element, said roof element opening up said lateral, inwardly directed offsets of said roll bar, wherein said lateral, inwardly directed offsets of said fixed roll bar are each assigned, at least on a front side of said fixed roll bar, said covering which, in the closed position of said roof element, opens up a respective one of said lateral, inwardly directed offsets of said fixed roll bar for a passage of said opening and closing mechanism and which, in the open position of said roof element, covers said respective lateral, inwardly directed offset of said fixed roll bar.

2. The roof construction according to claim 1, wherein in the closed position of said roof element, said opening and closing mechanism presses said covering of said respective lateral, inwardly directed offset of said fixed roll bar into an opened-up position for a passage of said opening and closing mechanism.

3. The roof construction according to claim 2, wherein, in the closed position of said roof element, said opening and closing mechanism presses said covering of said respective lateral, inwardly directed offset counter to a spring force acting on said covering into the opened-up position.

4. The roof construction according to claim 1, wherein, in the open position of said roof element, said opening and closing mechanism of said roof element opens up said covering of said respective lateral, inwardly directed offset of said fixed roll bar.

5. The roof construction according to claim 4, wherein, in the open position of said roof element, said covering of said respective lateral, inwardly directed offset is pressed by a spring force into a covering position.

6. The roof construction according to claim 1, further comprising a spring clip and said covering of said respective lateral, inwardly directed offset is a tensioning element which is fastened to said spring clip.

7. The roof construction according to claim 6, wherein:
   said fixed roll bar has a further covering; and
   said spring clip is fastened at a first end to said fixed roll bar or to said further covering of said fixed roll bar and, at an opposite, free second end, bears said tensioning element.

8. The roof construction according to claim 1, wherein said covering of said respective lateral, inwardly directed offset is a covering flap.

9. The roof construction according to claim 8,
   wherein said fixed roll bar has a further covering; and
   further comprising a shifting mechanism having at least one spring-loaded link, said covering flap is coupled to said fixed roll bar or to said further covering of said fixed roll bar via said shifting mechanism.

* * * * *